(12) United States Patent
Navab et al.

(10) Patent No.: US 6,587,783 B2
(45) Date of Patent: *Jul. 1, 2003

(54) METHOD AND SYSTEM FOR COMPUTER ASSISTED LOCALIZATION, SITE NAVIGATION, AND DATA NAVIGATION

(75) Inventors: Nassir Navab, Plainsboro, NJ (US); Xiang Zhang, Lawrenceville, NJ (US); Vijay Kumar, Plainsboro, NJ (US); Benedicte Bascle, Plainsboro, NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/971,555
(22) Filed: Oct. 5, 2001
(65) Prior Publication Data

US 2002/0069013 A1 Jun. 6, 2002

Related U.S. Application Data

(60) Provisional application No. 60/238,252, filed on Oct. 5, 2000.

(51) Int. Cl.$^7$ .................................................. G01C 21/00
(52) U.S. Cl. ..................................... 701/200; 701/211
(58) Field of Search ............................... 701/200, 205, 701/206, 211

Primary Examiner—Yonel Beaulieu
(74) Attorney, Agent, or Firm—Donald B. Paschburg

(57) ABSTRACT

A method and system for computer assisted site navigation includes capturing an image of a scene for providing real-time image data, calibrating a camera and localizing the image by utilizing the image data and retrieved marker registration and floor-map data for providing position and orientation data, transmitting the data to a web server, utilizing the image data and information on the scene retrieved from a database for deriving an augmented view, and displaying the augmented view.

13 Claims, 5 Drawing Sheets

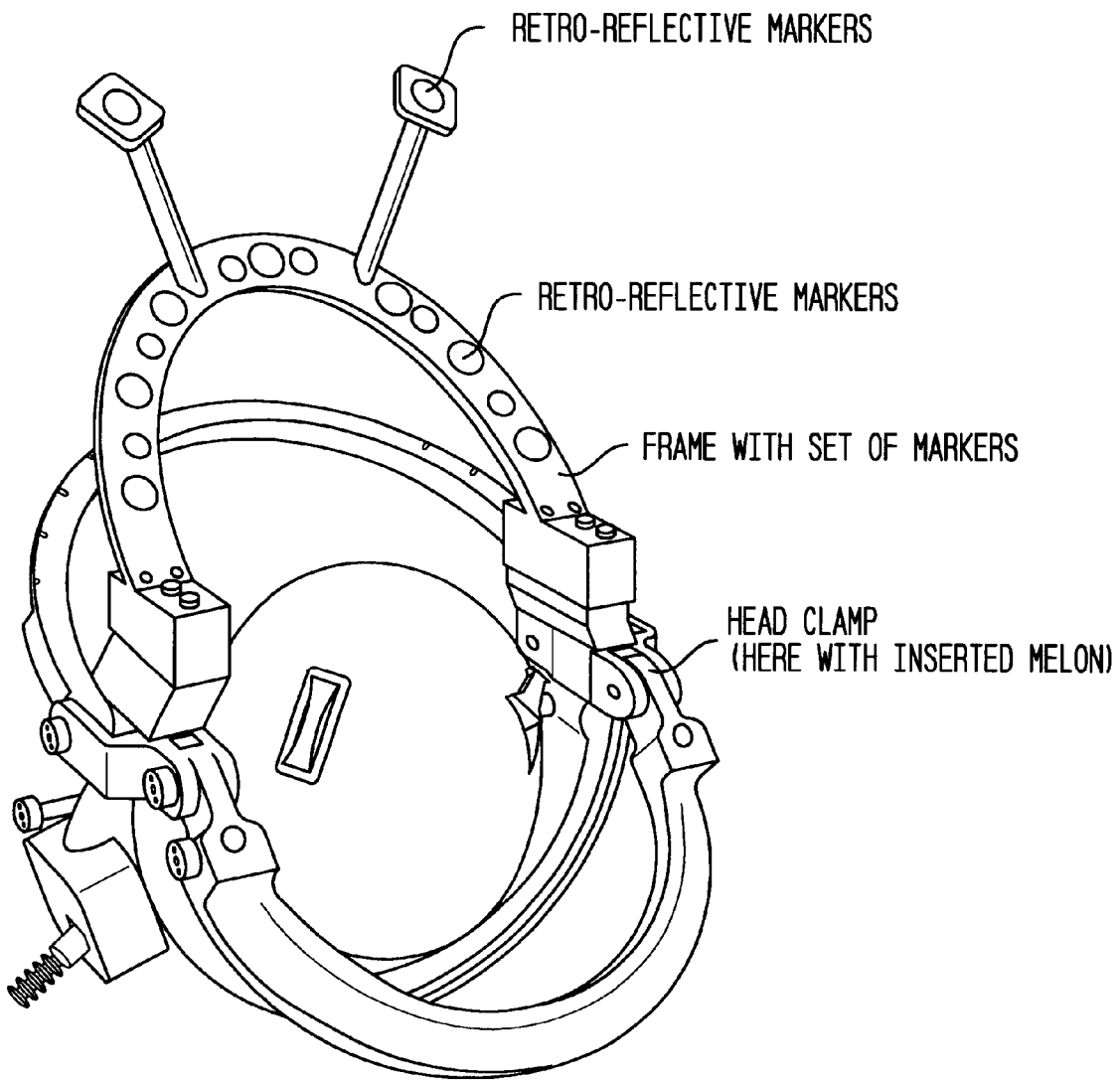

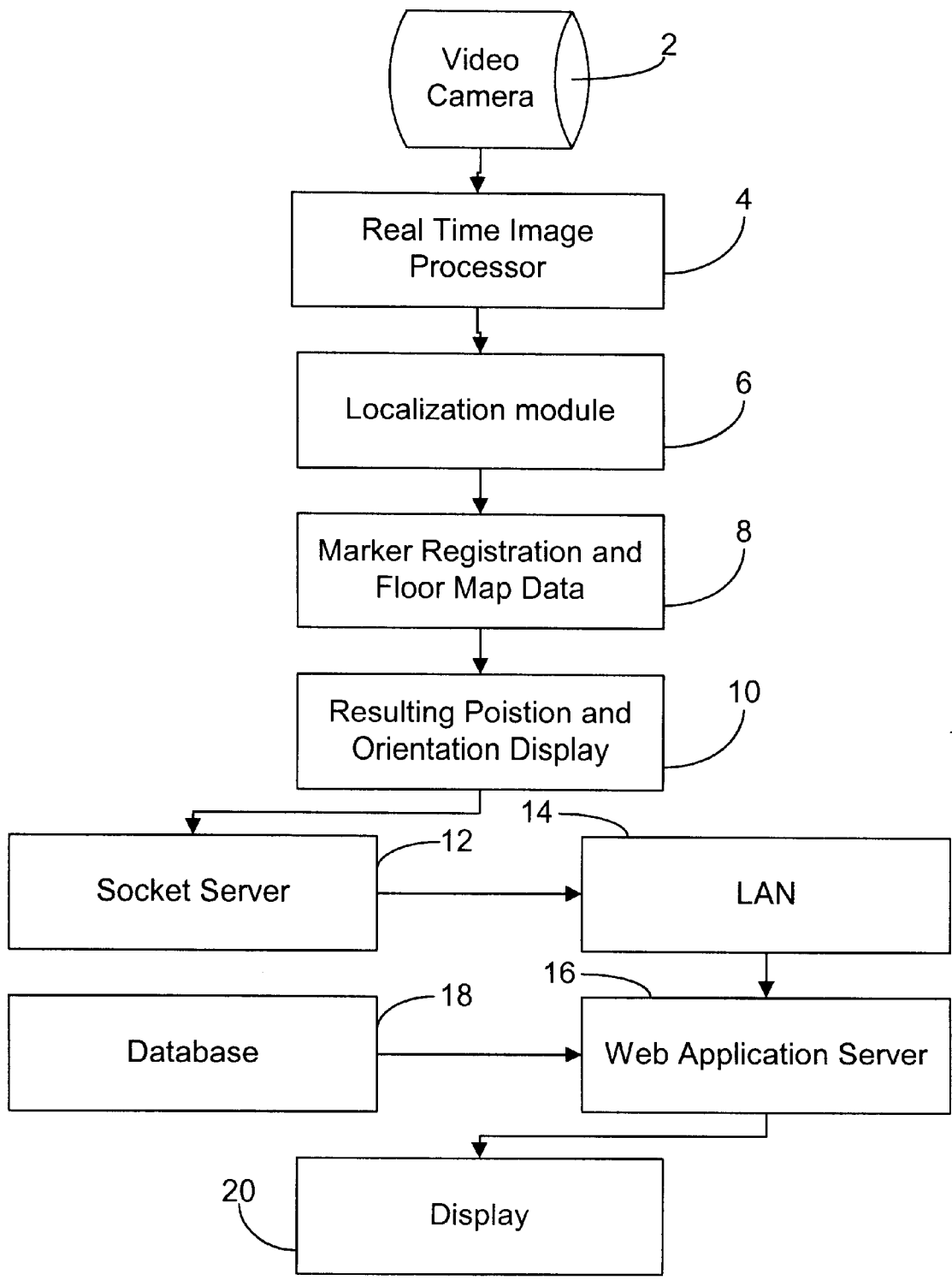

METHOD AND SYSTEM FOR COMPUTER ASSISTED LOCALIZATION, SITE NAVIGATION, AND DATA NAVIGATION

CROSS-REFERENCE TO RELATED APPLICATIONS

Reference is hereby made to provisional patent application No. 60/238,252, filed Oct. 5, 2000 in the names of Navab, Zhang, Kumar, and Bascle, entitled COMPUTER ASSISTED LOCALIZATION AND ITS APPLICATIONS IN INDUSTRIAL ENVIRONMENTS, of which benefit is claimed for pending application Ser. No. 09/971,555; provisional patent application No. 60/326,960, filed Oct. 4, 2001 in the names of Zhang and Navab, entitled DESIGN CODED VISUAL MARKERS FOR TRACKING AND CAMERA CALIBRATION IN MOBILE COMPUTING SYSTEMS, of which benefit is claimed filed Oct. 2, 2002, Ser. No. 10/262,693; and provisional patent application No. 60/326,961, filed Oct. 4, 2001 in the names of Navab, Zhang, Genc, and Kumar, entitled TECHNOLOGIES FOR COMPUTER ASSISTED LOCALIZATION, SITE NAVIGATION, AND DATA NAVIGATION, of which benefit is claimed filed Oct. 3, 2002, Ser. No. 60/326,961, and whereof the disclosures are hereby incorporated herein by reference.

BACKGROUND OF THE INVENTION

The present invention relates to the field of computer assisted localization and navigation and, more particularly, to computer assisted localization and navigation in industrial-type environments.

A related type of system and method is disclosed in copending application Ser. No. 09/741,581, filed Dec. 20, 2000 in the names of Navab and Genc, entitled COMPUTER ASSISTED LOCALIZATION AND NAVIGATION IN INDUSTRIAL ENVIRONMENTS and whereof the disclosure is hereby incorporated herein by reference.

A person walking in a man-made environment equipped with a wearable or portable computer may want or need to get access databases containing information about his/her surroundings. If the user wants to access data which is position dependent, one can use a camera attached to the wearable computer to determine the position of the user which, in turn, can be used as an index to a database to retrieve the desired information.

For example, a maintenance person carrying a hand-held computer with a camera attached to it may be facing a wall within which concealed electrical wiring may need to be located. The computer can automatically detect the position of the user and retrieve and display an augmented image showing where the wires are in that wall.

Augmented reality has received attention from computer vision and computer graphics researchers. See, for example, IWAR'98. International Workshop on Augmented Reality, San Francisco, Calif., USA, October 1998; and IWAR'99. International Workshop on Augmented Reality, San Francisco, Calif., USA, October 1999.

When a real image needs to be augmented with a virtual object, typically one has to register the scene and the object in 3D. This registration generally involves determining the pose of the camera that has captured the picture and the three-dimensional structure of the scene. When the augmentation is done interactively, one needs to track the camera, i.e., to compute for each frame the position and orientation. Though far from being completely solved, tracking can be done in several ways. They may be classified as vision-based and non-vision-based solutions. Nonvision-based solutions include magnetic, infrared, acoustic trackers, and the like. Most of these methods are not suitable for industrial settings either due to their limited range or their operating conditions. For instance, magnetic trackers cannot operate near ferromagnetic objects.

BRIEF SUMMARY OF THE INVENTION

In accordance with an aspect of the invention, a method for computer assisted site navigation, comprises the steps of: capturing an image of a scene for providing real-time image data; calibrating the camera and localizing the image utilizing the image data and retrieved marker registration and floor-map data for providing position and orientation data; transmitting the data to a web server; utilizing the image data and information on the scene retrieved from a database for deriving an augmented view; and displaying the augmented view. See FIG. 4, for example.

In accordance with another aspect of the present invention, of the invention, a method for computer assisted site navigation, comprises the steps of: capturing an image of a scene including markers on a video camera for providing real-time image data; processing the image data for providing feature extraction and marker detection data; utilizing the feature extraction and marker detection data and stored information including marker registration and floor-maps for calibrating the camera, localizing the image, and computing coordinates for deriving position and orientation data; displaying the position and orientation data; transmitting the data to a web server; utilizing the image data and information on the scene retrieved from a database for deriving an augmented view; and displaying the augmented view.

BRIEF DESCRIPTION OF THE SEVERAL VIEWS OF THE DRAWINGS

The invention will be more fully understood from the following description of preferred embodiments in conjunction with the Drawing, in which

FIG. 4 shows a Navi-3D interface in accordance with the principles of the invention; and FIG. 5 shows a flow chart in accordance with the principles of the invention.

DETAILED DESCRIPTION OF THE INVENTION

Figure 1:
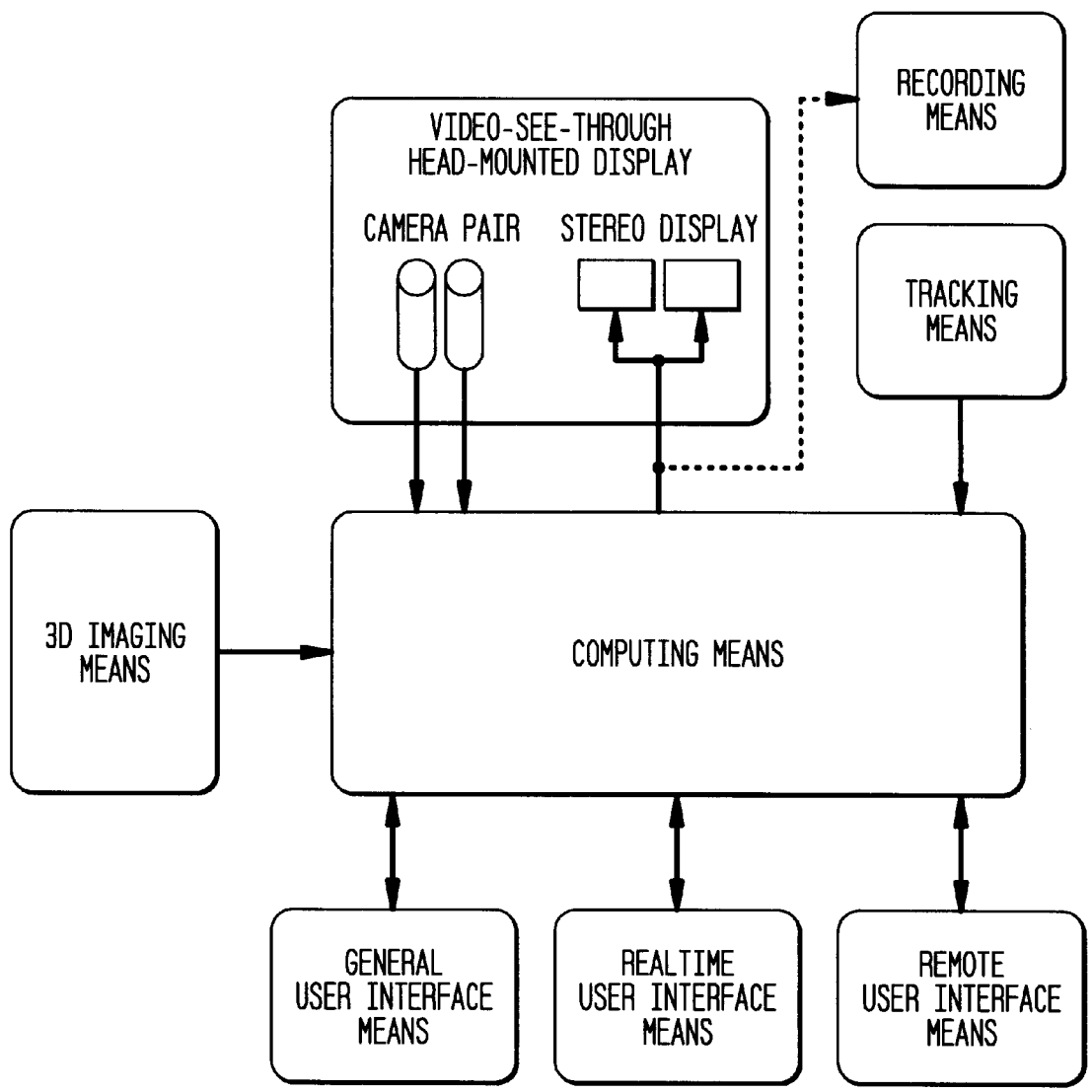
FIG. 1 shows a computer with a built-in video camera as may be used in the invention.
Figure 2:
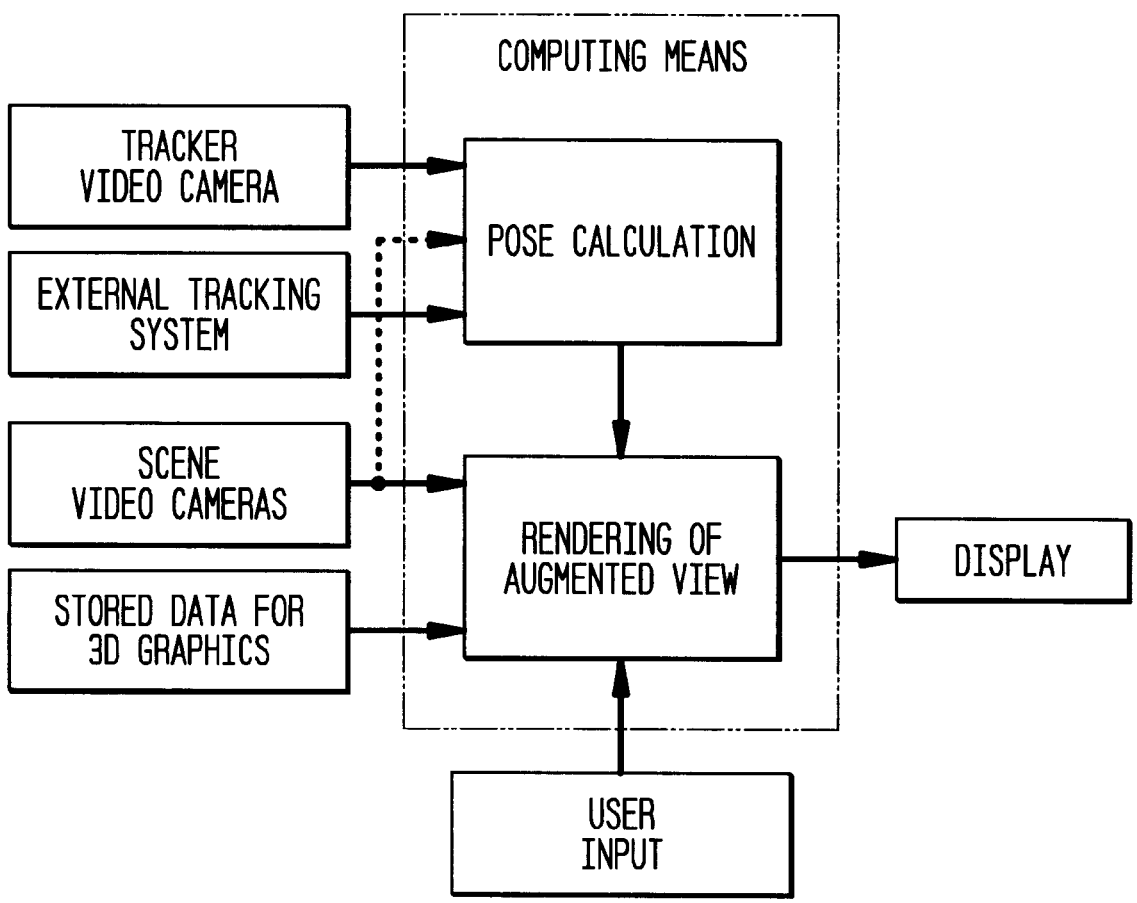
FIG. 2 shows a wearable computer as may be used in the invention.

In accordance with an exemplary embodiment of the invention, a mobile computer can be used, as well as a desktop, laptop, or wearable computer such as the "Xybernaut". See FIG. 2. A camera is coupled or attached to the computer, for example, a USB camera for normal visual capturing or by way of an infrared filter. See FIG. 1. A database management system server, installed on the mobile computer itself or on a remote system to accessible from the mobile computer via wire or wireless network communication. Application software is utilized that performs real-time marker-based localization and sends the localization results to the server. Client application software is utilized that processes the data obtained from the server. This client application could be a plug-in of a web browser or this application can be combined with the localization application. Images may be displayed to a user on a screen or, for example, on a head-mounted display.

In operation, the camera finds the position of the camera and the user, and the processed or raw localization results are sent to the database server. The server then sends the corresponding information to the application. The client application then displays the corresponding information to the users that have the corresponding access right.

Figure 3:
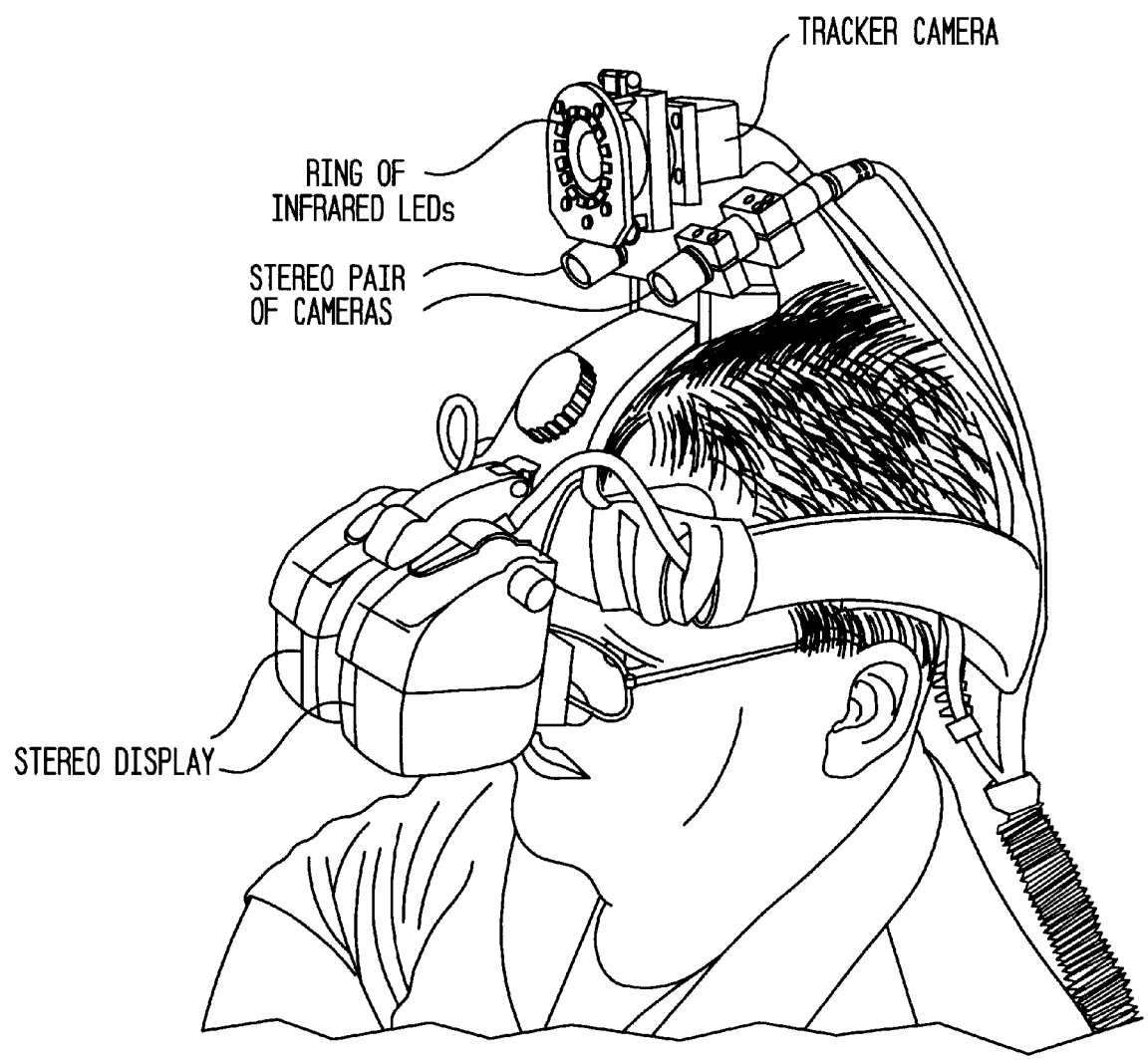
FIG. 3 shows an example of localization and a navigation interface in accordance with the principles of the invention.

Accurate localization information of the user using a wearable computer and an attached camera (visual or infrared) can thus be obtained. See FIG. 3, for example. The application implemented with the localization functionality sends the 3-dimensional (3D) localization information through the computer network, optional by wireless communication, to the database server.

In accordance with an aspect of the invention, the best AR/VR view of the 3D world is displayed to the user(s), this being the best view that is available on the database. The AR view are presented in real time. This is achieved by superimposing virtual information onto the real-time video image from the camera, based on the user and/or the system's choice. For example, a 3D virtual model of the equipment, such as a forklift truck, can be inserted into the real image at the position to see if it can fit into that position when it is needed there for operational or maintenance purposes.

In accordance with an embodiment of the invention, directional instructions are provided for the navigation system, such as displaying a "turn to right here" to guide the user to the site of certain equipment for which the user is looking.

Maintenance instructions, such as the superposition of text such as "Step 2: Open the hood for repair" or "turn off this switch before proceeding to the next step" are provided the user over the corresponding equipment.

Furthermore, clients and the server can have protected access for security reasons. The user needs a password or equivalent unique identification to access a connected database. Users at different administrative levels can have different access rights. Based on the user's access level, the server provides different information to the user. For example, while a repair person may see some repair instructions of the screen or head mounted display of their mobile computer, a manager in the center control room may see some higher level information showing on his screen.

In accordance with an embodiment of the invention, voice control of functions is optionally available. This is particularly important, since it is generally very desirable to free the hands of a user, particular a user such as a maintenance person for performing job functions.

The operation will be still better understood by reference to the chart shown in FIG. 5, referring to an exemplary embodiment. A video camera 2 obtains images of the real world installation being contemplated. Real time images are then processed with optional feature extraction and marker detection as shown at 4. Improvement and optimization of marker arrangements are disclosed in the aforementioned provisional patent applications, herein incorporated by reference.

The resulting data is then used for the localization function as shown at localization module 6 which computes the position and direction of the camera in reference to global coordinates, with marker registration and floor map data being provided at 8. The resulting position and orientation data is displayed at 10, together with navigation guidance information. The resulting position and orientation data is also supplied by way of a socket server 12 to the local area network (LAN) 14, from whence it is transmitted to a web application server 16. Web application server 16 receives images and 3D reconstruction data from a database 18 and outputs 3D augmented views to a display 20. In summary, the camera captures real-time video and the digitized images are passed to the system for image processing. The image processing allows the system to detect the coded markers that are captured in the images and also to compute the image correspondence of the feature points (such as the corners) of the marker. The code of the marker detected and its correspondence is then used for camera calibration and localization. Camera calibration is the process that uses the marker image correspondences as input to compute the camera position and orientation related to the position and orientation of the marker.

Based on the code of the marker, we can obtain the position and orientation of the marker in the global settings. Therefore, we can compute the exaction position of the user in the global system. The localization results are displayed on the floor-map for navigation guidance. We can also make the localization results to be available on the network using a socket server.

Another application, such as the one shown in the flowchart in FIG. 5 can use a socket client to connect to the socket server and obtain the localization results. Such a web application called Navi-3D has been implemented. This Navi-3D application can obtain localization results and access database for virtual environment and images and using these available data and the localization information to create the best AR view for the user. The user can also directly interact with the database from the web application interface.

While the invention has been described by way of exemplary embodiments, it will be understood by one of skill in the art to which it pertains that various changes and modifications may be made without departing from the spirit of the invention. Such changes and the like are contemplated to be within the scope of the invention as defined by claims following.

What is claimed is:

1. A method for computer assisted site navigation, comprising the steps of:
    capturing an image of a scene for providing real-time image data;
    calibrating a camera and localizing said image utilizing said image data and retrieved marker registration and floor-map data for providing position and orientation data;
    transmitting said data to a web server;
    utilizing said image data and information on said scene retrieved from a database for deriving an augmented view; and
    displaying said augmented view.

2. A method for computer assisted site navigation as recited in claim 1, including a step of processing said image data to extract features and to detect markers in said image.

3. A method for computer assisted site navigation as recited in claim 1, including a step of displaying said position and information data for providing navigation guidance.

4. A method for computer assisted site navigation as recited in claim 1, wherein said step of transmitting said data to a web server comprises transmitting said data by way of a local area network (LAN).

5. A method for computer assisted site navigation as recited in claim 1, wherein said step of transmitting said data to a web server comprises transmitting said data by way of wireless communication.

6. A method for computer assisted site navigation, comprising the steps of:
   capturing an image of a scene including markers on a video camera for providing real-time image data;
   processing said image data for providing feature extraction and marker detection data;
   utilizing said feature extraction and marker detection data and stored information including marker registration and floor-maps for calibrating said camera, localizing said image, and computing coordinates for deriving position and orientation data;
   displaying said position and orientation data;
   transmitting said data to a web server;
   utilizing said image data and information on said scene retrieved from a database for deriving an augmented view; and
   displaying said augmented view.

7. A method for computer assisted site navigation as recited in claim 6, including the steps of:
   utilizing said position and orientation data to identify and retrieve a stored message; and
   displaying said message.

8. A method for computer assisted site navigation as recited in claim 7, wherein said step of displaying said message comprises displaying an instruction.

9. A method for computer assisted site navigation as recited in claim 6, including the step of:
   positioning a user-selected image within said augmented image in a manner and position in accordance with a user's command.

10. A method for computer assisted site navigation as recited in claim 6, including the step of responding to a voice instruction by a user.

11. A method for computer assisted site navigation as recited in claim 6, wherein said step of utilizing said position and orientation data to identify and retrieve a stored message comprises a step of responding to an user-inputted password and for selecting a corresponding message.

12. A system for computer assisted site navigation comprises:
   means for capturing an image of a scene for providing real-time image data;
   means for calibrating a camera and localizing said image utilizing said image data and retrieved marker registration and floor-map data for providing position and orientation data;
   means for transmitting said data to a web server;
   means for utilizing said image data and information on said scene retrieved from a database for deriving an augmented view; and
   means for displaying said augmented view.

13. A system for computer assisted site navigation comprises:
   means for capturing an image of a scene including markers on a video camera for providing real-time image data;
   means for processing said image data for providing feature extraction and marker detection data;
   means for utilizing said feature extraction and marker detection data and stored information including marker registration and floor-maps for calibrating said camera, localizing said image, and computing coordinates for deriving position and orientation data;
   means for displaying said position and orientation data;
   means for transmitting said data to a web server;
   means for utilizing said image data and information on said scene retrieved from a database for deriving an augmented view; and
   means for displaying said augmented view.

* * * * *